United States Patent
Zhou et al.

(10) Patent No.: US 11,506,769 B2
(45) Date of Patent: Nov. 22, 2022

(54) METHOD AND DEVICE FOR DETECTING PRECISION OF INTERNAL PARAMETER OF LASER RADAR

(71) Applicant: BAIDU ONLINE NETWORK TECHNOLOGY (BEIJING) CO., LTD., Beijing (CN)

(72) Inventors: Xun Zhou, Beijing (CN); Yuanfan Xie, Beijing (CN); Shirui Li, Beijing (CN); Liang Wang, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 644 days.

(21) Appl. No.: 16/562,274

(22) Filed: Sep. 5, 2019

(65) Prior Publication Data
US 2020/0081105 A1  Mar. 12, 2020

(30) Foreign Application Priority Data
Sep. 6, 2018 (CN) .......................... 201811039514.2

(51) Int. Cl.
*G01S 7/497* (2006.01)
*G06T 7/60* (2017.01)
(Continued)

(52) U.S. Cl.
CPC .............. *G01S 7/497* (2013.01); *G01S 17/42* (2013.01); *G06T 7/60* (2013.01); *G06V 20/588* (2022.01);
(Continued)

(58) Field of Classification Search
CPC .................................. G01S 7/497; G01S 17/42
See application file for complete search history.

(56) References Cited

U.S. PATENT DOCUMENTS

| 2015/0066412 | A1 | 3/2015 | Nordbruch | |
|---|---|---|---|---|
| 2016/0188986 | A1* | 6/2016 | Aoki | ........................ G06T 7/73 348/135 |
| 2017/0336792 | A1* | 11/2017 | Gdalyahu | ............. B60W 40/06 |

FOREIGN PATENT DOCUMENTS

| CN | 104820217 A | 8/2015 |
|---|---|---|
| CN | 104931943 A | 9/2015 |

(Continued)

OTHER PUBLICATIONS

Chinese Patent Application No. 201811039514.2, Second Office Action dated Jun. 30, 2020, 8 pages.
Chinese Patent Application No. 201811039514.2, English translation of Second Office Action dated Jun. 30, 2020, 9 pages.
(Continued)

*Primary Examiner* — Jerry T Jean Baptiste
(74) *Attorney, Agent, or Firm* — Lathrop GPM LLP

(57) ABSTRACT

Embodiments of the present disclosure provide a method and a device for detecting a precision of an internal parameter of a laser radar, a related apparatus and a medium. The method may include the following steps. Point cloud data collected by the laser radar arranged on an autonomous mobile carrier travelling on a flat road is obtained. A three-dimensional scene reconstruction is performed based on the point cloud data collected to obtain a point cloud model of a three-dimensional scene. The point cloud model of the three-dimensional scene is divided to obtain the road. A thickness of the road is determined based on the point cloud data of the road. It is determined whether the internal parameter of the laser radar is precise based on the thickness of the road.

15 Claims, 4 Drawing Sheets

(51) Int. Cl.
G01S 17/42 (2006.01)
G06V 20/56 (2022.01)
G01S 17/931 (2020.01)

(52) U.S. Cl.
CPC ........ *G01S 17/931* (2020.01); *G06T 2207/10028* (2013.01); *G06T 2207/30256* (2013.01)

(56) References Cited

FOREIGN PATENT DOCUMENTS

| | | |
|---|---|---|
| CN | 105404844 A | 3/2016 |
| CN | 105627938 A | 6/2016 |
| CN | 107167788 A | 9/2017 |
| CN | 107179534 A | 9/2017 |
| CN | 107272019 A | 10/2017 |
| CN | 107945198 A | 4/2018 |
| CN | 108254758 A | 7/2018 |
| JP | 2005055311 A | 3/2005 |
| JP | 2007248056 A | 9/2007 |
| JP | 2012007922 A | 1/2012 |
| JP | 2016045507 A | 4/2016 |
| JP | 2016531281 A | 10/2016 |
| KR | 20160057174 A | 5/2016 |

OTHER PUBLICATIONS

Japanese Patent Application No. 2019-154042, Office Action dated Jan. 5, 2021, 4 pages.
Japanese Patent Application No. 2019-154042, English translation of Office Action dated Jan. 5, 2021, 4 pages.
Japanese Patent Application No. 2019-154042, Office Action dated Jun. 2, 2020, 6 pages.
Japanese Patent Application No. 2019-154042, English translation of Office Action dated Jun. 2, 2020, 6 pages.
Thickness—Definition from the Merriam-Webster Online Dictionary, Apr. 24, 2009 Retrieved from the Internet: https://web.archive.org/web/20090424171457/https://www.merriam-webster.com/dictionary/thickness on Nov. 25, 2019, 1 page.
European Patent Application No. 19195035.1, extended Search and Opinion dated Feb. 4, 2020, 11 pages.
Chinese Patent Application No. 201811039514.2, Office Action dated Mar. 2, 2020, 8 pages.
Chinese Patent Application No. 201811039514.2, English translation of Office Action dated Mar. 2, 2020, 10 pages.

* cited by examiner

METHOD AND DEVICE FOR DETECTING PRECISION OF INTERNAL PARAMETER OF LASER RADAR

CROSS-REFERENCE TO RELATED APPLICATIONS

This application claims priority and benefit of Chinese Application No. 201811039514.2, filed on Sep. 6, 2018, the entire content of which is incorporated herein by reference.

TECHNICAL FIELD

The present disclosure relates to the field of sensor technology, and more particularly, to a method and a device for detecting a precision of an internal parameter of a laser radar, a related apparatus and medium.

BACKGROUND

With development of sensor technology, laser radar may be increasingly applied to transportation, map drawing, unmanned vehicles, military and other fields, due to high resolution and good concealment of laser radar. Laser radar may use a large number of light rays to fully describe an environment, which is important for high-precision map drawing, unmanned vehicle, building survey, and home service robot.

SUMMARY

Embodiments of the present disclosure provide a method for detecting a precision of an internal parameter of a laser radar. In one embodiment, the method includes:

obtaining point cloud data collected by the laser radar provided on an autonomous mobile carrier traveling on a flat road;

performing a three-dimensional scene reconstruction based on the point cloud data collected, to obtain a point cloud model of a three-dimensional scene;

dividing the point cloud model of the three-dimensional scene to obtain a road;

determining a thickness of the road according to point cloud data of the road, and determining whether the internal parameter of the laser radar is precise based on the thickness of the road.

Embodiments of the present disclosure provide a device for detecting a precision of an internal parameter of a laser radar. The device includes:

a point cloud data obtaining module, configured to obtain point cloud data collected by a laser radar provided on an autonomous mobile carrier traveling on a flat road;

a three-dimensional scene modeling module, configured to perform three-dimensional scene reconstruction based on the point cloud data collected to obtain a point cloud model of a three-dimensional scene;

a road surface dividing module, configured to divide the point cloud model of the three-dimensional scene to obtain a road;

a road thickness determining module, configured to determine a thickness of the road according to point cloud data in the road; and an internal parameter precision verifying module, configured to determine whether the internal parameter of the laser radar is precise based on the thickness of the road.

Embodiments of the present invention provide an apparatus, which may include:

one or more processors;

a storage device, configured to store one or more programs that when executed by the one or more processors, cause the one or more processors to execute the method for detecting a precision of an internal parameter of a laser radar according to any one of embodiments of the first aspect.

Embodiments of the present disclosure provide a medium having a computer program stored thereon. When the computer program is executed by the processor, the method for detecting a precision of an internal parameter of a laser radar according to any one of embodiments of the first aspect is executed.

BRIEF DESCRIPTION OF THE DRAWINGS

In order to clearly illustrate the technical solution of embodiments of the present disclosure, drawings used in embodiments will be briefly described below. It should be understood, the drawings only illustrate some embodiments of the present disclosure, and thus should not be construed as a limitation on the scope. Those skilled in the art may obtain other drawings according to these drawings without any creative work.

DETAILED DESCRIPTION

Figure 1:
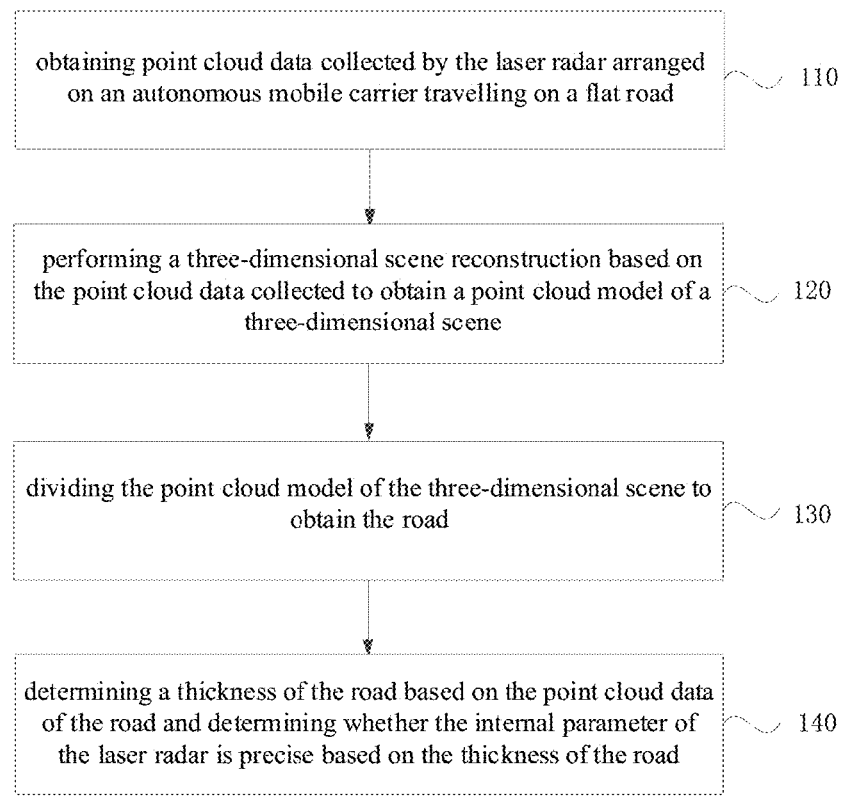
FIG. 1 is a flowchart illustrating a method for detecting a precision of an internal parameter of a laser radar according to embodiments of the present disclosure.

The present disclosure will be described in more details below with reference to accompanying drawings and embodiments. It may be understood that specific embodiments described herein may be merely used to illustrate the present disclosure but are notintended to limit the present disclosure. It should be noted that for ease of description, only some but not all structures related to the present disclosure are illustrated in the drawings.

It should be noted that similar reference numerals and letters indicate similar items in the drawings. Therefore, once an item is defined in the drawings, it is not necessary to further define and explain the item in subsequent drawings. Also, in the description of the present disclosure, terms "first", "second", and the like may be used merely to distinguish items from each other, and are not to be construed as indicating or implying a relative importance.

At present, internal parameters of a laser radar, such as a pose and emission angle of a laser transceiver, may be set up by factory. Errors caused by the mass production process may result in that a precision of an internal parameter may not satisfy requirements on an actual application. The imprecise internal parameter may cause a serious effect on high-precision map drawing and automatic driving, resulting in poor user experience. It is therefore necessary to provide a method for automatically detecting an internal parameter that does not satisfy a requirement on accuracy.

Therefore, embodiment of the present disclosure provide a method and a device for detecting a precision of an internal parameter of a laser radar, a related apparatus and a medium, to identify whether the internal parameter of the laser radar is precise.

With the method and the device for detecting a precision of an internal parameter of a laser radar, the related apparatus and the medium according to embodiments of the present disclosure, point cloud data may be obtained by the laser radar during a traveling process of the autonomous mobile carrier on the flat road. A three-dimensional scene reconstruction may be performed according to the point cloud data collected to obtain a point cloud model of a three-dimensional scene. The point cloud model of the three-dimensional scene may be divided and point cloud data of the scene other than the point cloud data of the road may be filtered to obtain the road. A thickness of the road may be determined based on the point cloud data of the road. It may be determined whether the internal parameter is precise based on the thickness of the road. With the above technical solution, a new way for automatically detecting the precision of the internal parameter of the laser radar may be provided.

FIG. 1 is a flowchart illustrating a method for detecting a precision of an internal parameter of a laser radar according to embodiments of the present disclosure. Embodiments of the present disclosure may be applicable to a case of determining whether the internal parameter of the laser radar is precise. The method may be implemented by a device for detecting a precision of an internal parameter of a laser radar according to embodiments of the present disclosure. The device may be implemented by software and/or hardware. The device may be integrated into an autonomous mobile carrier such as an autonomous vehicle. As illustrated in FIG. 1, the method may include the following.

At block 110, point cloud data collected by a laser radar provided on an autonomous mobile carrier traveling on a flat road is obtained.

The autonomous mobile carrier may be an unmanned mobile device, such as an autonomous vehicle or the like. The laser radar may be a multi-beam laser radar. Multiple laser emitters are distributed vertically such that multiple scanning lines may be formed by rotation of a motor, in a single scan. The multi-beam laser radar may be usually a three-dimensional (3D) laser radar such that the data obtained may be three-dimensional. For example, in response to determining that the autonomous mobile carrier is the autonomous vehicle, the multi-beam laser radar may be installed at a roof or a windshield of the autonomous vehicle.

The point cloud data may refer to a set of points in three-dimensional coordinates to characterize an outer surface shape of an object. Geometric position information of a three-dimensional space may be represented by (x, y, z) for a point. The point cloud data may also represent RGB (Red-Green-Blue) color, gray value, depth, and division result of a point. In embodiments, the point cloud data collected by the laser radar may be the point cloud data of a scene of a flat road, including the point cloud data of objects such as trees, lights, and vehicles on the road, and point cloud data of the road.

It should be noted that in a case where the internal parameter of the laser radar is imprecise, the flat road may be detected to have a bowl-shaped curved surface, such that the road formed by the point cloud data detected may have the bowl-shaped curved surface. Therefore, the above characteristic may be used to allow the autonomous mobile carrier travelling on the flat road to detect the precision of the internal parameter of the laser radar.

More specifically, the laser radar may be mounted on the autonomous mobile carrier. When the autonomous mobile carrier is travelling on the flat road, the scene of the flat road may be scanned by the laser radar provided on the autonomous mobile carrier to obtain the point cloud data of the scene of the road.

At block 120, a three-dimensional scene reconstruction is performed based on the point cloud data collected to obtain a point cloud model of a three-dimensional scene.

The 3D scene reconstruction may refer to fusing the point cloud data collected to reproduce the scene of the flat road. For example, the point cloud data collected may be fused using an ICP (iterative closest point) algorithm. In addition, the point cloud data collected may be fused based on real-time positioning data, such as GPS (global positioning system) data, obtained by the GPS or a BeiDou navigation satellite system (BDS). The point cloud model of the 3D scene may refer to a 3D point cloud image obtained by fusing the point cloud data collected.

Figure 2:
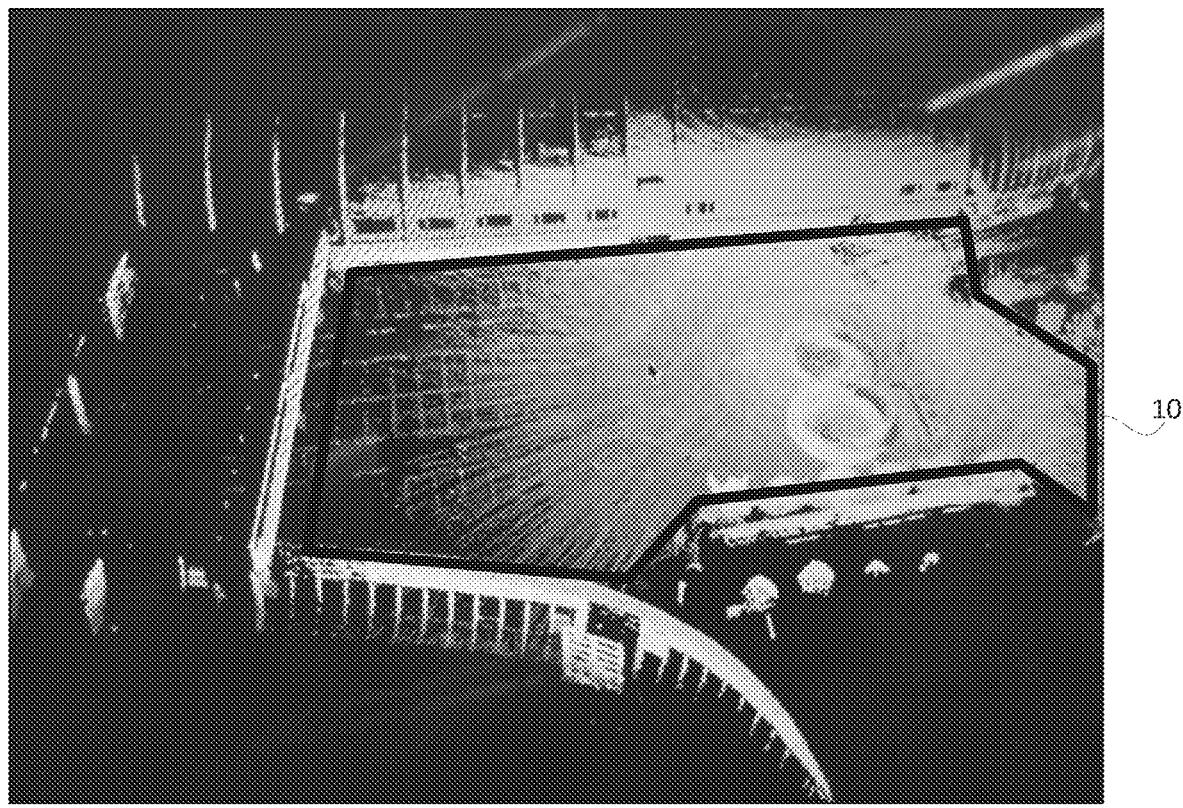
FIG. 2 is a schematic diagram illustrating a point cloud model of a three-dimensional scene constructed by point cloud data according to embodiments of the present disclosure.

In one aspect, based on the point cloud data collected and actual information of the road, the ICP algorithm may be used to fuse the point cloud data collected to obtain the point cloud model of the 3D scene. As illustrated in FIG. 2, the point cloud model of the 3D scene on the road is shown. The actual information of the road may include objects, such as trees, lights, vehicles on the road, and may also include locations of the objects.

At block 130, the point cloud model of the 3D scene is divided to obtain the road.

The road may be formed by the point cloud data of the road, which may also be called as road point cloud in a 3D scene.

In another aspect, a point cloud division threshold may be determined according to the point cloud model of the 3D scene and the point cloud data collected. The point cloud model of the 3D scene may be divided based on the point cloud division threshold to remove the point cloud data of objects, such as trees, lights and the vehicles in the scene of the road other than the road to obtain the point cloud data of the road. For example, the road obtained by dividing the point cloud model of the 3D scene illustrated in FIG. 2 may be indicated by the numeral reference 10.

The point cloud model of the 3D scene may also be divided to obtain the road by modeling. For example, a Gaussian mixture background model may be used to extract a background (such as the road) directly from the point cloud model of the 3D scene. In some examples, the point cloud model of the 3D scene may be divided to obtain the road using other algorithms, such as a random sample consensus (RANSAC) algorithm.

At block 140, a thickness of the road is determined based on the point cloud data of the road, and it is determined whether the internal parameter of the laser radar is precise based on the thickness of the road.

The thickness of the road refers to a difference between an upper boundary and a lower boundary of the road in the point cloud model of the 3D scene constructed by the point cloud data collected.

In one aspect, a road surface, such as a ground plane, may be obtained by fitting, based on a point cloud data line of the road, the point cloud data collected. A distance from each point of point cloud data of the road to the ground plane may be calculated. The thickness of the road may be determined based on the distance. The point cloud data may be divided into two sets of point cloud data according to a distribution characteristics of the point cloud model of the 3D scene. Two planes may be obtained by fitting the two sets of point cloud data respectively. For each set of point cloud data, the thickness may be determined by a distance from each point of the point cloud data to the plane determined. The thickness of the road may be determined based on the determined thickness of the two planes. In some examples, the point cloud data of the upper boundary and the point cloud data of the lower boundary of the road may be obtained respectively in the point cloud model of the 3D scene constructed by the point cloud data collected. An upper plane may be determined according to the point cloud data of the upper boundary, and a lower plane may be determined according to the point cloud data of the lower boundary. The thickness of the road may be determined by calculating a distance between the two planes.

After the thickness of the road is determined based on the point cloud data of the road, the thickness of the road may be compared with a preset thickness threshold to determine whether the internal parameter of the laser radar is precise. For example, in a case where the thickness of the road is greater than the preset thickness threshold, it may be determined that the internal parameter of the laser radar is imprecise. The preset thickness threshold may refer to a preset value, which may be corrected based on actual road conditions. The smaller the thickness threshold, the higher the accuracy of determining whether the internal parameter of the lidar is precise. For example, the preset thickness threshold may be 20 cm.

In one aspect, in a case where the thickness of the road determined based on the point cloud data of the road is greater than the preset thickness threshold of 20 cm, it may indicate that the point cloud data collected by the laser radar is imprecise, and thus the internal parameter of the laser radar is imprecise. In a case where the thickness of the road surface is less than or equal to the preset thickness threshold of 20 cm, it may indicate that the point cloud data collected by the laser radar is precise, and thus the internal parameter of the laser radar is precise.

With the technical solution according to embodiments of the present disclosure, the point cloud data may be collected by the laser radar during a traveling process of the autonomous mobile carrier on the flat road. The 3D scene reconstruction may be performed based on the point cloud data collected to obtain the point cloud model of the 3D scene. The point cloud model of the 3D scene may be divided and the point cloud data of an object in the scene of the road other than the road may be filtered out, to obtain the road. The thickness of the road may be determined based on the point cloud data constituting the road. It may be determined whether the internal parameter of the laser radar is precise based on the thickness of the road. This technical solution may provide a new way for automatically detecting the precision of the internal parameter of the laser radar.

Figure 3:
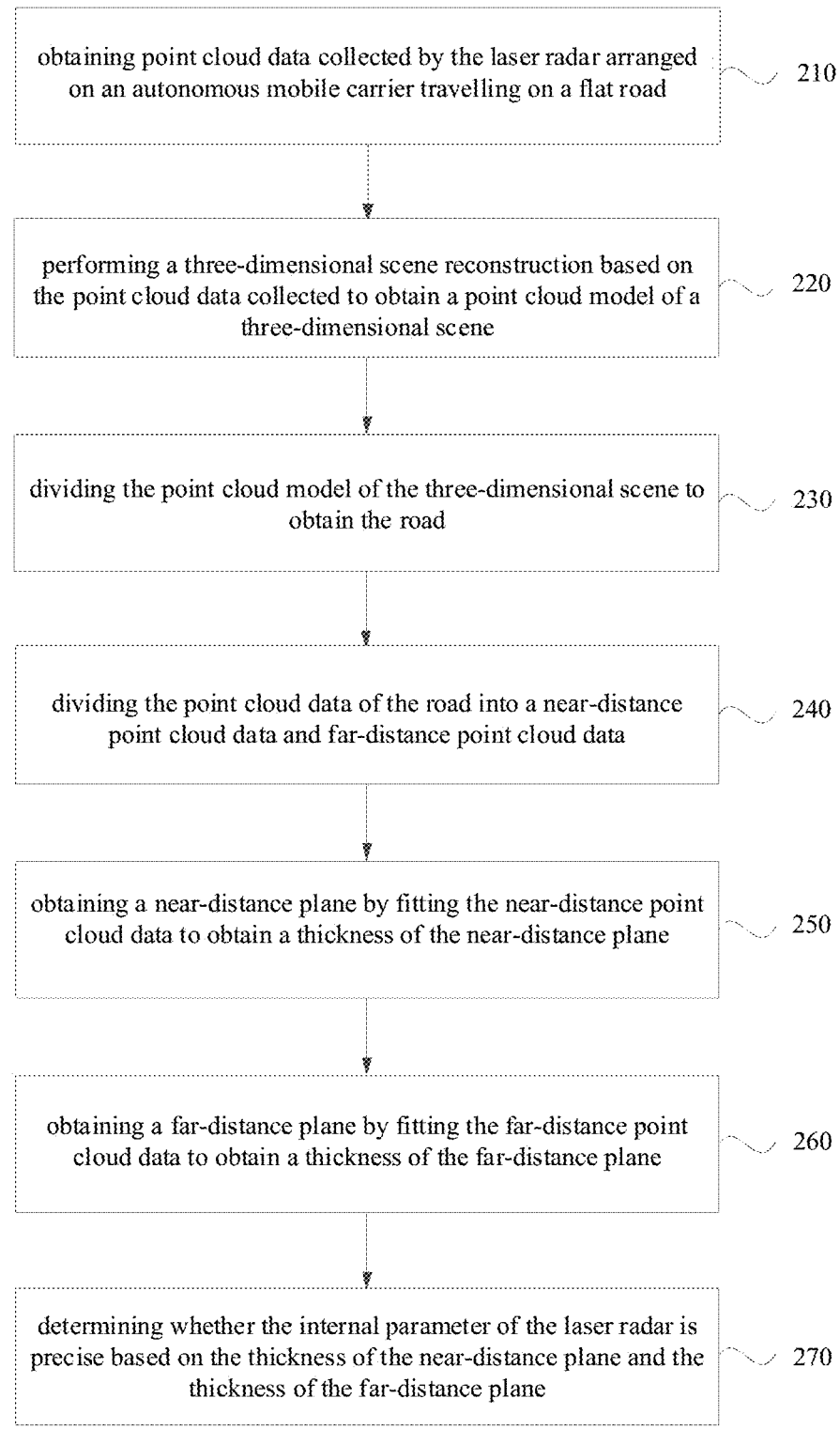
FIG. 3 is a flowchart illustrating a method for detecting a precision of an internal parameter of a laser radar according to embodiments of the present disclosure.

FIG. 3 is a flowchart illustrating a method for detecting a precision of an internal parameter of a laser radar according to embodiments of the present disclosure. The embodiment illustrated in FIG. 3 may be based on the above embodiment illustrated in FIG. 1, providing a method for determining the thickness of the road based on point cloud data of the road and determining whether the internal parameter of the laser radar is precise based on the thickness of the road. As illustrated in FIG. 3, the method in embodiments may include the following.

At block 210, point cloud data collected by a laser radar provided on an autonomous mobile carrier travelling on a flat road is obtained.

At block 220, a 3D scene reconstruction is performed based on the point cloud data collected to obtain the point cloud model of the 3D scene.

At block 230, the point cloud model of the 3D scene is divided to obtain the road.

At block 240, the point cloud data of the road is divided into near-distance point cloud data and far-distance point cloud data.

In certain embodiments, with a lot of experiments, it may be found that collecting the point cloud data by the laser radar may have the following characteristics. 1) A density of the point cloud data near the laser radar is greater than the density of the point cloud data far from the laser radar. 2) In a case where the internal parameter is precise, as the distance from the laser radar increases, the road gradually rises or bends. The thickness of the road far from the laser radar is thicker than the thickness of the road near the laser radar, by fusing multiple frames of point cloud data.

Therefore, according to the above characteristics, the point cloud data of the road may be divided into the near-distance point cloud data and the far-distance point cloud data based on the division threshold. The close-distance point cloud data may refer to the point cloud within a distance threshold from the laser radar. The long-distance point cloud data may refer to the point cloud data outside the distance threshold from the laser radar. The division threshold may be a preset value based on a measuring range of the laser radar and may be proportional to the measuring range of the laser radar, which may be corrected according to an actual situation. For example, the division threshold may be 30% to 40% of the measuring range of the laser radar.

For example, the road 10 obtained by removing the point cloud data of an object included in the scene of the road other than the road in the point cloud model of the 3D scene illustrated in FIG. 2 may be taken as an example for description. A center indicated by the numeral reference 8 on the road may be taken as a center of a circle and the division threshold may be taken as a radius of the circle, for division. The point cloud data within the circle may be determined as the close-distance cloud data, while the point cloud data outside the circle may be determined as the long-distance point cloud data.

At block 250, a near-distance plane is obtained by fitting the near-distance point cloud data, to determine a thickness of the near-distance plane.

In one aspect, the near-distance plane may be obtained by performing a plane fitting using an existing method of plane fitting. For example, the RANSAC algorithm may be employed to fit the close-distance point cloud data to a preset plane to obtain the near-distance plane. The thickness corresponding the near-distance plane may be determined based on a distance from each point of the near-distance point cloud data to the near-distance plane.

For example, fitting the near-distance point cloud data to obtain the near-distance plane and determining the thickness of the near-distance plane may include the following.

A. The near-distance point cloud data are fitted to obtain the near-distance plane.

In certain embodiments, the RANSAC algorithm may be taken as an example to describe the fitting of the near-distance plane according to the near-distance point cloud data. In one aspect, it is assumed that an equation of a preset plane function is: $ax+by+cz+d=0$. Parameters a, b, c and d in the preset plane function may be calculated from an original data set (e.g., the near-distance point cloud data), to obtain an initial near-distance plane function. A statistic is performed to obtain the number of points in the original data set having a less distance to a plane determined by the initial near-distance plane function than a preset distance threshold. In a case where the number of points satisfying the above condition is less than a preset point value, the original data set may be updated using the points satisfying the above condition, i.e., the points satisfying the above condition may be determined to replace the original data set. The method returns back to blocks of calculating the parameters of the preset plane function and performing the statistic to obtain the number of points satisfying the above condition, until the number of points satisfying the above condition is greater than or equal to the preset point value, the method ends (the iteration is stopped). A plane determined by the initial near-distance plane function having the number of points satisfying the above condition greater than or equal to the preset point value may be determined as the near-distance plane. The preset distance threshold may refer to a predetermined value. The smaller the predetermined value is, the higher the precision is. The preset distance threshold may be corrected according to an actual situation. The preset point value may refer to a predetermined value and may be corrected according to an actual situation. For example, the preset point value may be 300.

B. The thickness of the near-distance plane is determined according to the distance from each point of the near-distance point cloud data to the near-distance plane.

In one aspect, after the near-distance plane is obtained by fitting the near-distance point cloud data, the distance from each point of the near-distance point cloud data to the near-distance plane is calculated. The thickness of the near-distance plane may be determined based on at least one of a distance mean, a variance or a mean function. For example, the distance mean may be determined as the thickness of the near-distance plane. It is also possible to determine a maximum distance among each distance as the thickness of the near-distance plane.

At block 260, a far-distance plane is obtained by fitting the far-distance point cloud data, to determine the thickness of the far-distance plane.

The method of obtaining the far-distance plane by fitting the far-distance point cloud data to determine the thickness of the far-distance plane is similar to that of obtaining the near-distance plane by fitting the near-distance point cloud data and determining the thickness of the near-distance plane, except that the near-distance plane is determined based on the near-distance point cloud data, while the far-distance plane is determined based on the far-distance point cloud data. In one aspect, the far-distance plane may be obtained by performing the plane fitting with an existing plane fitting method to obtain the far-distance plane. For example, a RANSAC algorithm may be employed to obtain the far-distance plane by fitting the long-distance point cloud data to a preset plane. The thickness of the far-distance plane may be determined based on a distance from each point of the far-distance cloud point data to the far-distance plane. In some examples, obtaining the far-distance plane by fitting the far-distance point cloud data and determining the thickness of the far-distance plane may include: obtaining the far-distance plane by fitting the far-distant point cloud data and determining the far-distance plane based on the distance from each point of the far-distant point cloud data to the far-distance plane.

At block 270, it is determined whether the internal parameter of the laser radar is precise based on the thickness of the near-distance plane and the thickness of the far-distance plane.

In another aspect, a difference between the thickness of the near-distance plane and the thickness of the far-distance plane may be obtained. In a case where an absolute value of the difference is smaller than a threshold, it may indicate that the near-distance plane and the far-distance plane are almost horizontal to each other. That is, it may be determined that the road is flat and it may be determined that the internal parameter of the laser radar is precise. In a case where the absolute value of the difference is greater than or equal to the threshold, it may indicate that the far-distance plane is upturned or bent. That is, the road has a bowl-shaped surface and it may be determined that the internal parameter of the laser radar is imprecise.

With the technical solution according to embodiments of the present disclosure, the point cloud data during the traveling process of the autonomous mobile carrier on the flat road may be collected by the laser radar. The 3D scene reconstruction may be performed based on the point cloud data collected to obtain the point cloud model of the 3D scene. The point cloud model of the 3D scene may be divided and the point cloud data of an object in the scene of the road other than the road may be filtered out, to obtain the road. The point cloud data may be divided into near-distance point cloud data and the far-distance point cloud data based on the characteristics of the point cloud data collected by the laser radar. The thickness of the near-distance plane and the thickness of the far-distance plane may be determined according to the near-distance plane obtained by fitting the near-distance point cloud data and the far-distance plane obtained by fitting the far-distance point cloud data. It may be determined whether the internal parameter is precise based on the thickness of the far-distance plane and the thickness of the near-distance plane. A new way for automatically detecting the precision of the internal parameter of the laser radar is provided.

Figure 4:
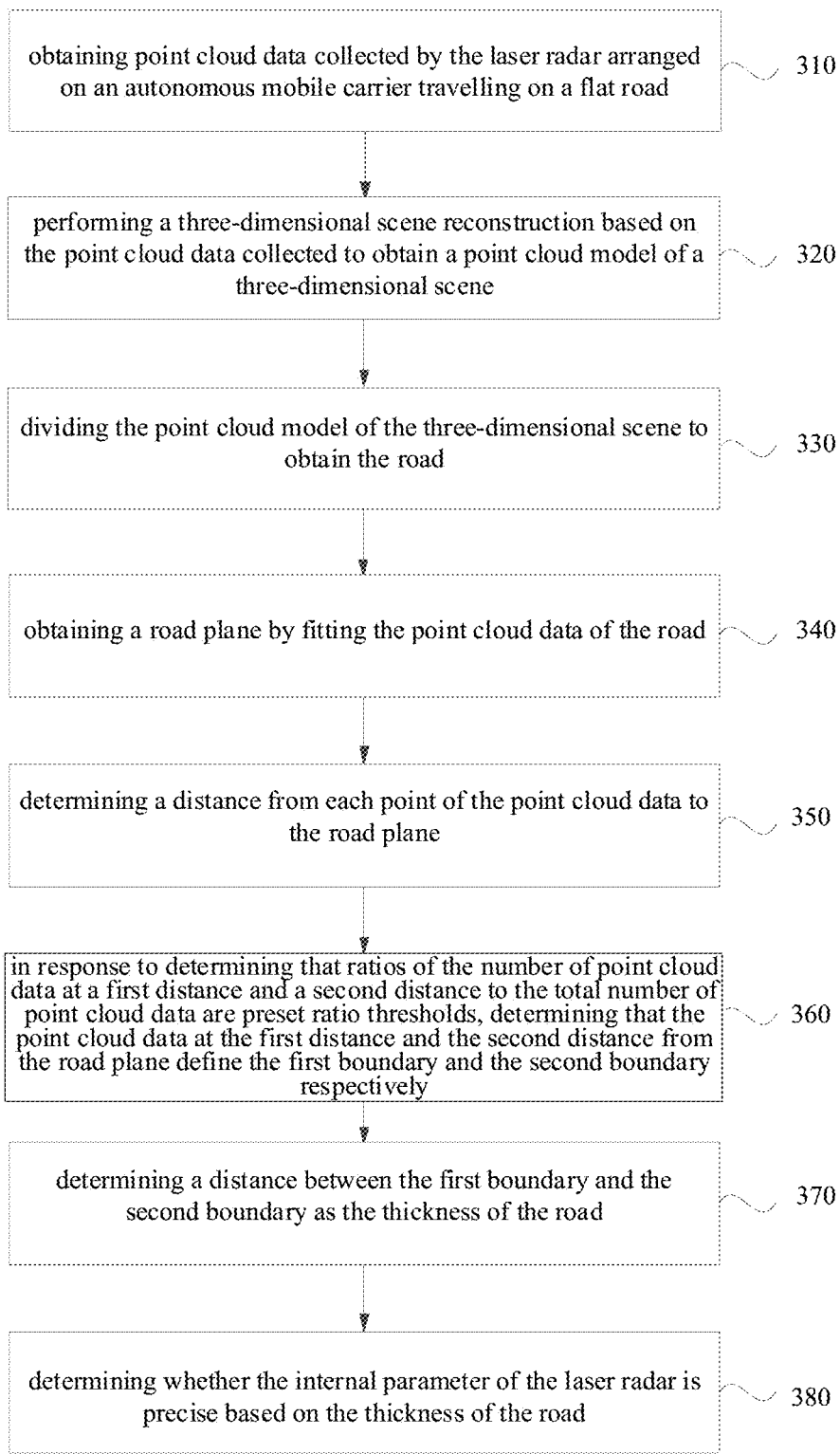
FIG. 4 is a flowchart illustrating a method for detecting a precision of an internal parameter of a laser radar according to embodiments of the present disclosure.

FIG. 4 is a flowchart illustrating a method for detecting a precision of an internal parameter of a laser radar according to embodiments of the present disclosure. The embodiments illustrated in FIG. 4 is based on the embodiment illustrated in FIG. 3. A method for determining a thickness of the road based on the point cloud data of the road and determining whether the internal parameter of the laser radar is precise based on the thickness of the road is provided. As illustrated in FIG. 4, the method in embodiments may include the following.

At block 310, point cloud data collected by a laser radar provided on an autonomous mobile carrier travelling on a flat road is obtained.

At block 320, a 3D scene reconstruction is performed according to the point cloud data collected to obtain a point cloud model of a 3D scene.

At block 330, the point cloud model of the 3D scene is divided to obtain a road.

At block 340, the point cloud data of the road is fitted to a road plane.

The road plane may be a plane of the ground. In detail, an existing plane fitting method may be employed to perform plane fitting to obtain the road plane. For example, a RANSAC algorithm may be employed. The manner of determining the road plane by employing the RANSAC algorithm may be the same as the method for determining the near-distance plane in the example illustrated in FIG. 3, except that the near-distance plane is determined based on the near-distance point cloud data, which the road plane is determined based on the point cloud data of the road including the near-distance point cloud data and the far-distance point cloud data.

At block 350, a distance from each point of the point cloud data to the road plane is determined.

In one aspect, after the road plane is obtained by fitting the point cloud data, the distance from each point of the point cloud data to the road plane is calculated, i.e., the distance between a point and a plane.

At block 360, in a case where a ratio of the number of points at a first distance to the total number of points and a ratio of a number of point cloud data at a second distance to the total number of point cloud data are preset ratio thresholds, it is determined that the point cloud data at the first distance from the road plane defines a first boundary of the road and the point cloud data at the second distance from the road plane and a second boundary of the road.

The total number of point cloud data may refer to the total number of road point cloud data. The ratio threshold may refer to a preset proportion, which may be corrected according to an actual situation. For example, the ratio threshold may be 1%. According to the statistics, a distance from a first preset number of point cloud data to the load plane may be determined as the first distance, and a distance from a second preset number of point cloud data to the load plane may be determined as the second distance. A ratio of the first preset number to the total number of point cloud data may be a first preset ratio threshold, while a ratio of the second preset number of point cloud data to the total number of point cloud data may be a second preset ratio threshold. Further, a boundary formed by the point cloud data at the first distance from the road plane may be defined as the first boundary of the road, and a boundary formed by the point cloud data at the second distance from the road plane may be defined as the second boundary of the road.

The first distance and the second distance may be determined by obtaining a distance histogram through fitting the point cloud data to the road plane, taking the distance as an abscissa and taking the number of point cloud data as an ordinate. Two intersection points between a line parallel to the abscissa and the distance histogram are obtained. Abscissa coordinates a and b of the two intersection points may be determined by projecting the two intersection points onto the abscissa. In a case where a ratio of the number of point cloud data corresponding to each intersection point to the total number of point cloud data is 1%, i.e., the number of point cloud data corresponding to the first distance to the total number and the number of point cloud data corresponding to the second distance to the total number are 1%, the distance corresponding to the point a may be determined as the first distance, and the distance corresponding to the point b may be determined as the second distance. It may be determined that the first boundary of the road is formed by the point cloud data corresponding to first distance from the road plane, and the second boundary of the road is formed by the point cloud data corresponding to the second distance from the road plane.

At block 370, a distance between the first boundary and the second boundary is determined as the thickness of the road.

At block 380, it is determined whether the internal parameter of the laser radar is precise based on the thickness of the road.

In another aspect, in a case where the thickness of the road is less than a thickness threshold, it may be determined that the internal parameter of the laser radar is precise. In a case where the thickness of the road is greater than or equal to the thickness threshold, it may be determined that the internal parameter of the laser radar is imprecise.

With the technical solution according to embodiments of the present disclosure, the point cloud data during the traveling process of the autonomous mobile carrier on the flat road may be collected by the laser radar. The 3D scene reconstruction may be performed based on the point cloud data collected to obtain the point cloud model of the 3D scene. The point cloud model of the 3D scene may be divided and the point cloud data of an object in the scene of the road other than the road may be filtered out to obtain the road. The road plane may be obtained by fitting the point cloud data of the road. A distance from each point of the point cloud data to the road plane may be determined. The first boundary and the second boundary of the road may be determined based on the distance. It may be determined whether the internal parameter of the laser radar is precise according to the two boundaries. A new way for automatically detecting whether the internal parameter of the laser radar is precise is provided.

Figure 5:
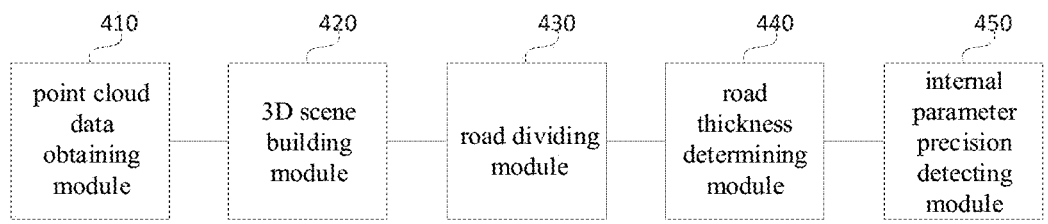
FIG. 5 is a schematic diagram illustrating a device for detecting a precision of an internal parameter of a laser radar according to embodiments of the present disclosure.

FIG. 5 is a block diagram illustrating a device for detecting a precision of an internal parameter of a laser radar according to embodiments of the present disclosure. The device may be configured to execute the method for detecting a precision of an internal parameter of a laser radar according to any one of embodiments of the present disclosure, include corresponding functional modules for executing the method and have beneficial effects. As illustrated in FIG. 5, the device may include a point cloud data obtaining module 410, a three-dimensional scene building module 420, a road dividing module 430, a road thickness determining module 440 and an internal parameter precision detecting module 450.

The point cloud data obtaining module 410 may be configured to obtain point cloud data collected by the laser radar provided on an autonomous mobile carrier travelling on a flat road.

The three-dimensional scene building module 420 may be configured to perform a three-dimensional scene reconstruction based on the point cloud data collected, to obtain a point cloud model of a three-dimensional scene.

The road dividing module 430 may be configured to divide the point cloud model of the three-dimensional scene to obtain the road.

The road thickness determining module 440 may be configured to determine a thickness of the road based on the point cloud data of the road.

The internal parameter precision detecting module 450 may be configured to determine whether the internal parameter of the laser radar is precise based on the thickness of the road.

With the technical solution according to the present disclosure, the point cloud data during the traveling process of the autonomous mobile carrier on the flat road may be collected by the laser radar. The 3D scene reconstruction may be performed based on the point cloud data collected to obtain the point cloud model of the 3D scene. The point cloud model of the 3D scene may be divided and the point cloud data of an object in the scene of the road other than the road may be filtered out, to obtain the road. The point cloud data may be divided into near-distance point cloud data and the far-distance point cloud data based on the characteristics of the point cloud data collected by the laser radar. The thickness of the near-distance plane and the thickness of the far-distance plane may be determined according to the near-distance plane obtained by fitting the near-distance point cloud data and the far-distance plane obtained by fitting the far-distance point cloud data. It may be determined whether the internal parameter is precise based on the thickness of the far-distance plane and the thickness of the near-distance plane. A new way for automatically detecting the precision of the internal parameter of the laser radar is provided.

In some examples, road thickness determining module 440 may be further configured to divide the point cloud data of the road into a near-distance point cloud data and far-distance point cloud data; obtain a near-distance plane by fitting the near-distance point cloud data to obtain a thickness of the near-distance plane; and obtain a far-distance plane by fitting the far-distance point cloud data to obtain a thickness of the far-distance plane.

The internal parameter precision detecting module 450 may be further configured to determine whether the internal parameter of the laser radar is precise based on the thickness of the near-distance plane and the thickness of the far-distance plane.

In some examples, the road thickness determining module 440 may be further configured to obtain the near-distance plane by fitting the near-distance point cloud data; and determine the thickness of the near-distance plane based on a distance from each point of the near-distance point cloud data to the near-distance plane.

In some examples, the road thickness detecting module 440 may be further configured to obtain a road plane by fitting the point cloud data of the road; determine a distance from each point of the point cloud data to the road plane; in response to determining that a ratio of the number of point cloud data at a first distance to the total number of point cloud data and a ratio of the number of point cloud data at a second distance to the total number of point cloud data are preset ratio thresholds, determine that the point cloud data at the first distance from the road plane defines a first boundary of the road and the point cloud data at the second distance from the road plane defines a second boundary of the road; and determine a distance between the first boundary and the second boundary as the thickness of the road.

In some examples, the internal parameter precision detecting module 450 may be further configured to in response to determining that the thickness of the road is greater than a preset thickness threshold, determine that the internal parameter of the laser radar is imprecise.

Figure 6:
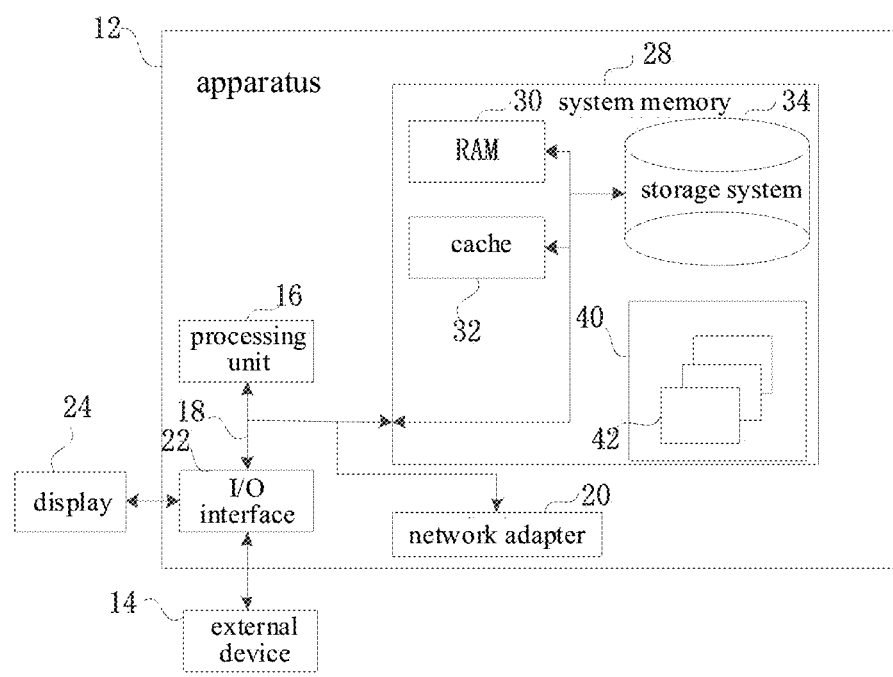
FIG. 6 is a schematic diagram illustrating an apparatus according to embodiments of the present disclosure.

FIG. 6 is a schematic diagram illustrating an apparatus according to embodiments of the present disclosure. A block diagram applicable for implementing an exemplary apparatus 6 according to embodiments of the present disclosure is illustrated in FIG. 6. The apparatus 12 illustrated in FIG. 6 may be merely an example, and should not be construed to limit functions and usage scope of embodiments of the present disclosure.

As illustrated in FIG. 6, the apparatus 12 may be in the form of a general-purpose computing apparatus. The apparatus 12 may include, but not limited to, one or more processors or processing units 16, a system memory 28, and a bus 18 for connecting different system components (including the system memory 28 and the processing unit 16).

The bus 18 may represent one or more of several types of bus architectures, including a memory bus or a memory control bus, a peripheral bus, a graphic acceleration port bus, a processor bus, or a local bus using any bus architecture in a variety of bus architectures. For example, these architectures include, but are not limited to, an industry standard architecture (ISA) bus, a micro-channel architecture (MAC) bus, an enhanced ISA bus, a video electronic standard association (VESA) local bus, and a peripheral component interconnect (PCI) bus.

Typically, the apparatus 12 may include multiple kinds of computer-readable media. These media may be any storage media accessible by the apparatus 12, including transitory or non-transitory storage medium and movable or unmovable storage medium.

The memory 28 may include a computer-readable medium in a form of volatile memory, such as a random-access memory (RAM) 30 and/or a high-speed cache memory 32. The apparatus 12 may further include other transitory/non-transitory and movable/unmovable computer system storage media. In way of example only, the storage system 34 may be used to read and write from and to non-removable and non-volatile magnetic media (not illustrated in the figure, commonly referred to as "hard disk drives"). Although not illustrated in FIG. 6, a disk driver for reading and writing to and from movable and non-volatile magnetic disks (e.g. "floppy disks") may be provided, as well as an optical driver for reading and writing to and from movable and non-volatile optical disks (e.g. a compact disc read only memory (CD-ROM), a digital video disc read only Memory (DVD-ROM), or other optical media) may be provided. In these cases, each driver may be connected to the bus 18 via one or more data interfaces. The system memory 28 may include at least one program product. The program product may have a set of (for example at least one) program modules. The program modules may be configured to perform functions of embodiments of the present disclosure.

A program/application 40 having a set of (at least one) program modules 42 may be stored in system memory 28. The program modules 42 may include, but not limit to, an operating system, one or more application programs, other program modules and program data. Any one or a combination of above examples may include an implementation in a network environment. The program modules 42 may be generally configured to implement functions and/or methods described in embodiments of the present disclosure.

The apparatus 12 may also communicate with one or more external devices 14 (e.g., a keyboard, a pointing device, a display 24, and etc.) and may also communicate with one or more devices that enables a user to interact with the apparatus 12, and/or any device (e.g., a network card, a modem, etc.) that enables the apparatus 12 to communicate with one or more other computing devices. The above communications can be achieved by the input/output (I/O) interface 22. In addition, in the apparatus 12 of embodiments, the display 24 may be not a separate physical entity, but may be embedded into a mirror. When nothing is displayed on a display surface of the display 24, the display surface of the display 24 may be visually same to the mirror. In addition, the apparatus 120 may be connected to and communicate with one or more networks such as a local area network (LAN), a wide area network (WAN) and/or a public network such as the Internet through a network adapter 20. As illustrated in FIG. 6, the network adapter 20 may communicate with other modules of the device 12 over the bus 18. It should be understood that although not illustrated in the figures, other hardware and/or software modules may be used in combination with the apparatus 12, including, but not limited to, microcode, device drivers, redundant processing units, external disk drive arrays, RAID systems, tape drives, as well as data backup storage systems and the like.

The processing unit 16 can perform various functional applications and data processing by running programs stored in the system memory 28, for example, to perform a method for detecting a precision of an internal parameter of a laser radar according to embodiments of the present disclosure.

Embodiments of the present disclosure provide a computer readable storage medium, having computer programs stored thereon that when executed by a processor cause the processor to perform the method for detecting a precision of an internal parameter of a laser radar according to embodiments of the present disclosure.

A combination of one or more computer readable media may be used. The computer readable medium may be a computer readable signal medium or a computer readable storage medium. The computer readable storage medium may be, but not limited to, for example, electrical, magnetic, optical, electromagnetic, infrared, or semiconductor system, apparatus, device, component or any combination thereof. A specific example of the computer readable storage medium includes (a non-exhaustive list): an electrical connection having one or more wires, a portable computer disk, a hard disk, a random access memory (RAM), a read only memory (ROM), an erasable programmable read only memory (EPROM or a flash memory), an optical fiber, a compact disc read-only memory (CD-ROM), an optical memory component, a magnetic memory component, or any suitable combination thereof. In the specification, the computer readable storage medium may be any tangible medium including or storing programs. The programs may be used by an instruction executed system, apparatus, device, or a connection thereof.

The computer readable signal medium may include a data signal propagated in baseband or as a part of carrier and carries computer readable program codes. Such propagated data signal may be in many forms, including but not limited to an electromagnetic signal, an optical signal, or any suitable combination thereof. The computer readable signal medium may also be any computer readable medium other than the computer readable storage medium. The computer readable medium may send, propagate, or transport programs used by an instruction executed system, apparatus, device, or a connection thereof.

The program codes stored on the computer readable medium may be transmitted using any appropriate medium, including but not limited to wireless, wireline, optical fiber cable, RF, or any suitable combination thereof.

The computer program codes for carrying out operations of embodiments of the present disclosure may be written in one or more programming languages. The programming language includes an object oriented programming language, such as Java, Smalltalk, C++, as well as conventional procedural programming language, such as "C" language or similar programming language. The program codes may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a local area network (hereafter referred as to LAN) or a wide area network (hereafter referred as to WAN).

In addition, embodiments of the present disclosure further provide a vehicle. The vehicle includes a vehicle body, the device according to any one of embodiments of the present disclosure arranged on the vehicle body and a laser radar and an imager connected in communication with the device.

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A method for detecting a precision of an internal parameter of a laser radar, comprising:
   obtaining point cloud data collected by the laser radar arranged on an autonomous mobile carrier travelling on a flat road;
   performing a three-dimensional scene reconstruction based on the point cloud data to obtain a point cloud model of a three-dimensional scene;
   dividing the point cloud model of the three-dimensional scene to obtain the road;
   determining a thickness of the road based on point cloud data of the road and determining whether the internal parameter of the laser radar is precise based on the thickness of the road;
   wherein determining the thickness of the road based on the point cloud data of the road and determining whether the internal parameter of the laser radar is precise based on the thickness of the road comprises:
      dividing the point cloud data of the road into near-distance point cloud data and far-distance point cloud data based on a division threshold, wherein the near-distance point cloud data is within the division threshold from the laser radar, and the far-distance point cloud data is outside the division threshold from the laser radar;
      obtaining a near-distance plane by fitting the near-distance point cloud data to obtain a thickness of the near-distance plane;
      obtaining a far-distance plane by fitting the far-distance point cloud data to obtain a thickness of the far-distance plane; and
      determining whether the internal parameter of the laser radar is precise based on the thickness of the near-distance plane and the thickness of the far-distance plane.

2. The method of claim 1, wherein obtaining the near-distance plane by fitting the near-distance point cloud data to obtain the thickness of the near-distance plane comprises:
   obtaining the near-distance plane by fitting the near-distance point cloud data; and
   determining the thickness of the near-distance plane based on a distance from each point of the near-distance point cloud data to the near-distance plane.

3. The method of claim 1, wherein determining the thickness of the road based on the point cloud data of the road comprises:
   obtaining a road plane by fitting the point cloud data of the road;
   determining a distance from each point of the point cloud data of the road to the road plane;
   in response to determining that a ratio of the number of points at a first distance to the total number of points and a ratio of a number of point cloud data at a second distance to the total number of point cloud data are preset ratio thresholds, determining that the point cloud data at the first distance from the road plane defines a first boundary of the road and the point cloud data at the second distance from the road plane defines a second boundary; and determining a distance between the first boundary and the second boundary as the thickness of the road.

4. The method of claim 1, wherein determining whether the internal parameter of the laser radar is precise based on the thickness of the road comprises:

in response to determining that the thickness of the road is greater than a preset thickness threshold, determining that the internal parameter of the laser radar is imprecise.

5. The method of claim 1, wherein dividing the point cloud model of the three-dimensional scene to obtain the road comprising:

determining a point cloud division threshold based on the point cloud model of the three-dimensional scene and the point cloud data; and dividing the point cloud model of the three-dimensional scene based on the point cloud division threshold and removing the point cloud data of an object other than the road, to obtain the road.

6. An electronic device, comprising:

one or more processors;

a storage device, configured to store one or more programs that when executed by the one or more processors, cause the one or more processors to:

obtain point cloud data collected by the laser radar arranged on an autonomous mobile carrier travelling on a flat road;

perform a three-dimensional scene reconstruction based on the point cloud data to obtain a point cloud model of a three-dimensional scene;

divide the point cloud model of the three-dimensional scene to obtain the road;

determine a thickness of the road based on point cloud data of the road and determine whether the internal parameter of the laser radar is precise based on the thickness of the road;

wherein the one or more processors are caused to determine the thickness of the road based on the point cloud data of the road and determine whether the internal parameter of the laser radar is precise based on the thickness of the road by:

dividing the point cloud data of the road into near-distance point cloud data and far-distance point cloud data based on a division threshold, wherein the near-distance point cloud data is within the division threshold from the laser radar, and the far-distance point cloud data is outside the division threshold from the laser radar;

obtaining a near-distance plane by fitting the near-distance point cloud data to obtain a thickness of the near-distance plane;

obtaining a far-distance plane by fitting the far-distance point cloud data to obtain a thickness of the far-distance plane; and determining whether the internal parameter of the laser radar is precise based on the thickness of the near-distance plane and the thickness of the far-distance plane.

7. The electronic device of claim 6, wherein the one or more processors are caused to obtain the near-distance plane by fitting the near-distance point cloud data to obtain the thickness of the near-distance plane by:

obtaining the near-distance plane by fitting the near-distance point cloud data; and determining the thickness of the near-distance plane based on a distance from each point of the near-distance point cloud data to the near-distance plane.

8. The electronic device of claim 6, wherein the one or more processors are caused to determine the thickness of the road based on the point cloud data of the road by:

obtaining a road plane by fitting the point cloud data of the road;

determining a distance from each point of the point cloud data of the road to the road plane;

in response to determining that a ratio of the number of points at a first distance to the total number of points and a ratio of a number of point cloud data at a second distance to the total number of point cloud data are preset ratio thresholds, determining that the point cloud data at the first distance from the road plane defines a first boundary of the road and the point cloud data at the second distance from the road plane defines a second boundary; and determining a distance between the first boundary and the second boundary as the thickness of the road.

9. The electronic device of claim 6, wherein the one or more processors are caused to determine whether the internal parameter of the laser radar is precise based on the thickness of the road by:

in response to determining that the thickness of the road is greater than a preset thickness threshold, determining that the internal parameter of the laser radar is imprecise.

10. The electronic device of claim 6, wherein the one or more processors are caused to divide the point cloud model of the three-dimensional scene to obtain the road by:

determining a point cloud division threshold based on the point cloud model of the three-dimensional scene and the point cloud data; and dividing the point cloud model of the three-dimensional scene based on the point cloud division threshold and removing the point cloud data of an object other than the road, to obtain the road.

11. A non-transitory computer readable storage medium, having a computer program stored thereon, wherein when the program is executed by a processor, a method for detecting a precision of an internal parameter of a laser radar is executed by the processor, the method comprising:

obtaining point cloud data collected by the laser radar arranged on an autonomous mobile carrier travelling on a flat road;

performing a three-dimensional scene reconstruction based on the point cloud data to obtain a point cloud model of a three-dimensional scene;

dividing the point cloud model of the three-dimensional scene to obtain the road;

determining a thickness of the road based on point cloud data of the road and determining whether the internal parameter of the laser radar is precise based on the thickness of the road;

wherein determining the thickness of the road based on the point cloud data of the road and determining whether the internal parameter of the laser radar is precise based on the thickness of the road comprises:

dividing the point cloud data of the road into near-distance point cloud data and far-distance point cloud data based on a division threshold, wherein the near-distance point cloud data is within the division threshold from the laser radar, and the far-distance point cloud data is outside the division threshold from the laser radar;

obtaining a near-distance plane by fitting the near-distance point cloud data to obtain a thickness of the near-distance plane;

obtaining a far-distance plane by fitting the far-distance point cloud data to obtain a thickness of the far-distance plane; and determining whether the internal parameter of the laser radar is precise based on the thickness of the near-distance plane and the thickness of the far-distance plane.

12. The non-transitory computer readable storage medium of claim 11, wherein obtaining the near-distance plane by fitting the near-distance point cloud data to obtain the thickness of the near-distance plane comprises:

obtaining the near-distance plane by fitting the near-distance point cloud data; and determining the thickness of the near-distance plane based on a distance from each point of the near-distance point cloud data to the near-distance plane.

13. The non-transitory computer readable storage medium of claim 11, wherein determining the thickness of the road based on the point cloud data of the road comprises:

obtaining a road plane by fitting the point cloud data of the road;

determining a distance from each point of the point cloud data of the road to the road plane;

in response to determining that a ratio of the number of points at a first distance to the total number of points and a ratio of a number of point cloud data at a second distance to the total number of point cloud data are preset ratio thresholds, determining that the point cloud data at the first distance from the road plane defines a first boundary of the road and the point cloud data at the second distance from the road plane defines a second boundary; and determining a distance between the first boundary and the second boundary as the thickness of the road.

14. The non-transitory computer readable storage medium of claim 11, wherein determining whether the internal parameter of the laser radar is precise based on the thickness of the road comprises:

in response to determining that the thickness of the road is greater than a preset thickness threshold, determining that the internal parameter of the laser radar is imprecise.

15. The non-transitory computer readable storage medium of claim 11, wherein dividing the point cloud model of the three-dimensional scene to obtain the road comprising:

determining a point cloud division threshold based on the point cloud model of the three-dimensional scene and the point cloud data; and dividing the point cloud model of the three-dimensional scene based on the point cloud division threshold and removing the point cloud data of an object other than the road, to obtain the road.

* * * * *